United States Patent

Willson et al.

[15] 3,645,443
[45] Feb. 29, 1972

[54] AUTOMOBILE THERMOSTAT

[72] Inventors: James R. Willson, Garden Grove, Calif.; Keith T. Krueger, Bellefontaine, Ohio

[73] Assignee: Robertshaw Controls Company, Richmond, Va.

[22] Filed: Dec. 19, 1969

[21] Appl. No.: 886,668

[52] U.S. Cl. ............................................................236/34
[51] Int. Cl. ..........................................................F01p 7/16
[58] Field of Search ..........................236/34, 34.5, 93, 101

[56] References Cited

UNITED STATES PATENTS 2,361,006  10/1944  Brown ....................................236/34
2,872,117  2/1959   Puster ....................................236/34
3,127,104  3/1964   Puster ....................................236/34
3,357,635  12/1967  Ullery ..................................230/114

Primary Examiner—Edward T. Michael
Attorney—Auzville Jackson, Jr., Robert L. Marben and Anthony A. O'Brien

[57] ABSTRACT

An automobile thermostat including an operator member for moving a valve member away from a valve seat when the temperature of a coolant is increased to a predetermined value, the operator member being constructed of a material having a temperature-actuated shape memory or a modulus of elasticity that varies with temperature.

9 Claims, 4 Drawing Figures

Patented Feb. 29, 1972  3,645,443
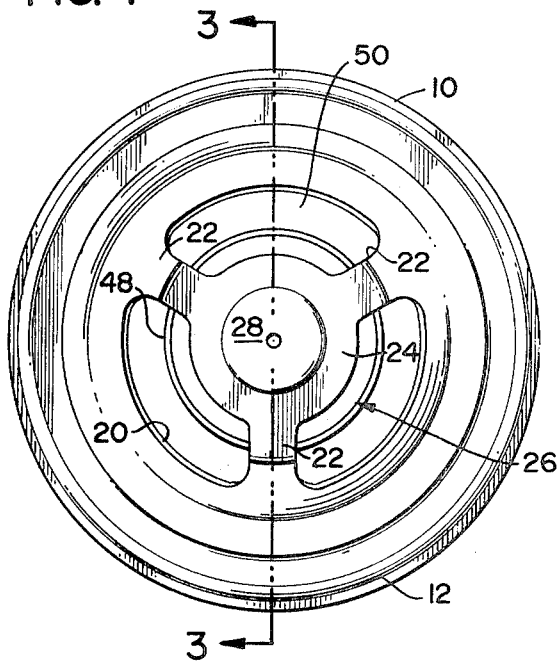
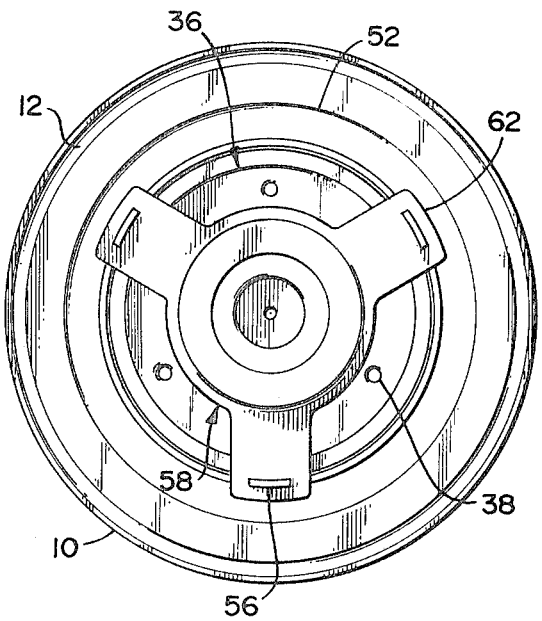
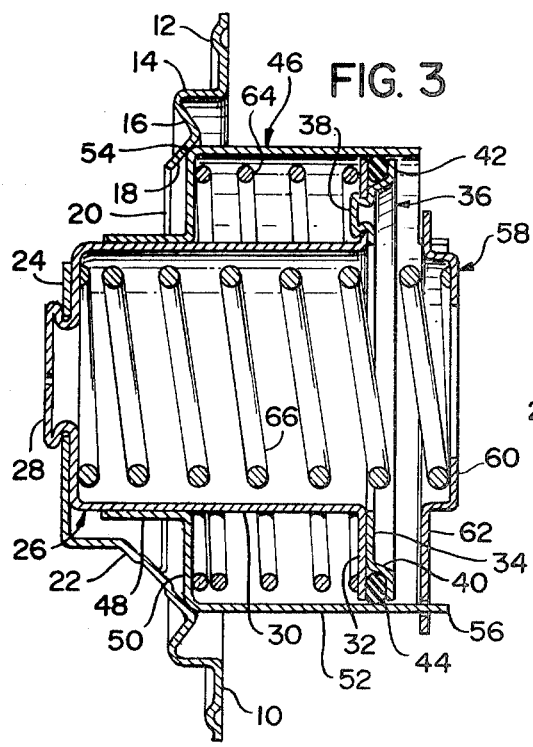
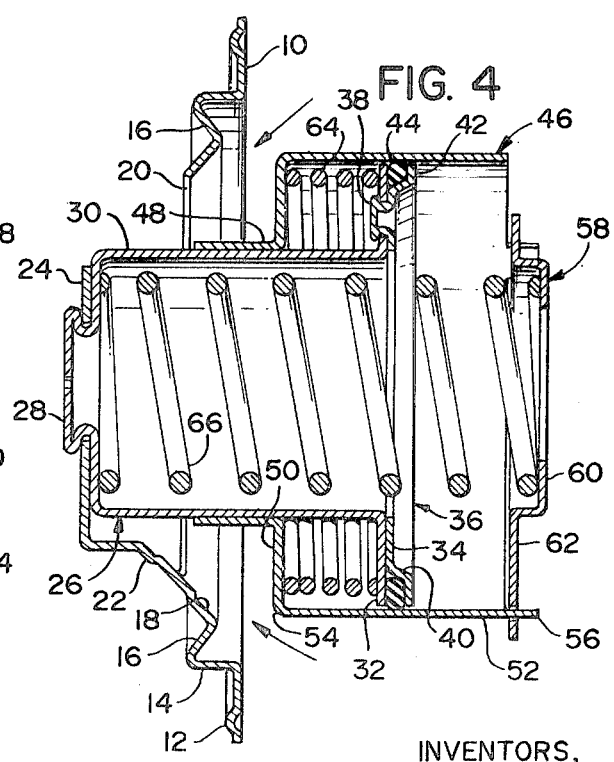
INVENTORS,
James R. Willson
Keith T. Krueger
BY Anthony A. O'Brien
ATTORNEY

AUTOMOBILE THERMOSTAT

BACKGROUND OF THE INVENTION

1. Field of the Invention

The present invention pertains to thermostatic valves and more particularly to automobile thermostats operable to control the circulation of a coolant for an engine.

2. Description of the Prior Art

Thermostatic valves are utilized in automobiles to control the circulation of coolant such that the coolant will circulate through the engine but not through the radiator until the coolant obtains a predetermined temperature. Once the predetermined temperature is obtained, the thermostatic valve opens to permit the coolant to circulate through the radiator thereby permitting the engine to warm up fast and be maintained at the proper operating temperature.

Conventional automobile thermostats utilize operator structures responsive to coolant temperature to move a piston such that a valve member is moved away from a valve seat. The operator structures normally utilized are relatively complex compared to the function provided; and accordingly, material and assembly costs are high. One problem which must be overcome in automobile thermostats is corrosion of the operator structure of the thermostat by the coolant; and, thus, conventional automobile thermostats normally utilize casings for the operator structure to prevent corrosion. This protection against corrosion further increases cost.

SUMMARY OF THE INVENTION

Accordingly, it is an object of the present invention to construct an automobile thermostat utilizing simplified, inexpensive operator structure that resists corrosion.

Another object of the present invention is to utilize an operator member that is readily assembled to accurately operate at a predetermined temperature in an automobile thermostat.

A further object of the present invention is to construct an automobile thermostat utilizing a valve that is rapidly moved between open and closed positions.

The present invention has another object in that an operator member for an automobile thermostat is constructed of a material having a temperature-actuated shape memory or a modulus of elasticity varying with temperature.

Some of the advantages of the automobile thermostat of the present invention over the prior art are that the number of components in the thermostat are reduced, assembly and material costs are reduced, rapid valve operation is provided, and the thermostat may be set to accurately operate at precise predetermined temperatures.

The present invention is generally characterized in an automobile thermostat including a valve member cooperating with a valve seat to control a flow of coolant therethrough, bias means forcing the valve member toward the valve seat, and an operator member forcing the valve member away from the valve seat and constructed of a material having a temperature-actuated shape memory, the operator member being disposed upstream of the valve seat to sense the temperature of the coolant and having a distorted shape when the coolant temperature is below a predetermined operating temperature and an initial shape when the coolant temperature is above the predetermined operating temperature whereby the operating member overcomes the bias means to move the valve member away from the valve seat when the operator member has its initial shape.

Further objects and advantages of the present invention will become apparent from the following description of a preferred embodiment taken in conjunction with the accompanying drawing.

BRIEF DESCRIPTION OF THE DRAWING

FIG. 1 is a top plan view of an automobile thermostat embodying the present invention;

FIG. 2 is a bottom plan view of FIG. 1;

FIG. 3 is a cross section taken along the line 3—3 of FIG. 1; and

FIG. 4 is a cross section similar to FIG. 3, but showing the automobile thermostat in an open position.

DESCRIPTION OF THE PREFERRED EMBODIMENT

The present invention is embodied in an automobile thermostat of the type utilized in the cooling system of an automobile engine. As is shown in FIGS. 1–3, the automobile thermostat includes a stationary supporting element in the form of an annular flange 10 with a circular sealing and aligning bead 12 adjacent its outer circumference. The beaded flange 10 is adapted for mounting between the mating ends of conduits conventionally utilized in automobile cooling systems. An annular wall 14 extends perpendicularly from the inner circumference of flange 10 to a reversely bent, inwardly directed wall 16 having a V-shaped cross section and having an inclined undersurface forming a fixed annular valve seat 18. The free end 20 of wall 16 is joined with three, equally spaced legs 22 which converge at a centrally apertured plate 24.

An inverted cup-shaped housing 26 has a bottom wall portion 28 extending through the aperture in plate 24 and deformed around such aperture so as to be fixed to the plate 24. A cylindrical wall 30 of housing 26 has a peripheral lip 32 extending radially outwardly from its open end, and a bottom ring 34 of an annular plate 36 is secured to lip 32 by means of three protrusions 38 extending through apertures in lip 32 and deformed around the apertures. The inner edge of ring 34 defines an aperture coinciding with the chamber defined by cylindrical wall 30 of housing 26, and the outer edge of ring 34 terminates in an annular wall 40 which has a peripheral lip 42 extending radially outward therefrom in parallel spaced relation with lip 32. A resilient balancing seal 44, such as an O-ring, is disposed between lips 32 and 42.

A valve member 46 is concentrically disposed with housing 26 and has a cylindrical wall 48 in sliding engagement with cylindrical wall 30 of housing 26. A shoulder 50 extends transversely from the bottom of cylindrical wall 48 and terminates in a cylindrical wall 52 at an arcuate outer surface 54 which is aligned with valve seat 18. Cylindrical wall 52 is cut to form three, equally spaced legs 56 which are disposed diametrically opposite protrusions 38. An annular support plate 58 has a recessed central portion 60 with a central aperture therein, and three equally spaced legs 62 aligned with legs 56 and having slots therein for attachment to legs 62. A coiled bias spring 64 is mounted in compression between lip 32 of housing 26 and the inner surface of shoulder 50.

An operator member 66 in the form of a coiled spring is mounted in compression between the bottom wall of housing 26 and the recessed central portion 60 of plate 58. Operator member 66 is constructed of a material having a temperature-actuated shape memory. By "temperature-actuated shape memory" is meant that a straight wire of such a material can be bent or contorted below its "martensitic" transition temperature and it will retain its deformed or distorted shape; but when the deformed wire is heated above its transition temperature with nothing constraining its movement, such wire will spring back to its initial straight shape. The transition temperature is represented by a rapid change in modulus on a modulus of elasticity vs. temperature curve. That is, as temperature decreases through the transition zone the modulus of elasticity decreases. As temperature increases through the transition zone the modulus of elasticity increases. One of the advantages of utilizing such a material is that operator members may be formed having varying shapes and cross sections other than the coiled spring illustrated.

For more specific information with respect to materials having a temperature-actuated shape memory, reference is made to U.S. Pat. No. 3,174,851 to Buehler et al. and U.S. Pat. No. 3,403,238 to Buehler et al. The above cited patents are concerned with alloys formed of nickel and titanium; however, while an alloy having a composition of 55 percent nickel by weight with the remainder being essentially titanium may be used with the present invention, the present invention is not limited to these alloys but may utilize any materials having similar properties. That is, any material having a temperature-actuated shape memory or a modulus of elasticity that varies with temperature may be used with the present invention.

In order to prepare operator member 66 for use in the automobile thermostat, the coiled spring is wound to a diameter and length corresponding to the valve member being in a fully open position. The operator member is retained in this position or shape to retard motion while the operator member is annealed. After annealing, the operator member is stabilized in any suitable manner; for instance, by compressing the operator member to its solid height at a temperature below the transition temperature with a heavy load greater than the load of bias spring 64. The operator member is then subjected to a plurality of complete temperature cycles with the heavy load by repeatedly raising the temperature above the transition temperature and then lowering the temperature below the transition temperature. Operator member 66 will return substantially to its initial annealed shape once the temperature is raised above the transition temperature since the modulus of elasticity will be increased to such an extent that the heavy load is insufficient to distort the operator member. Once the temperature drops below the transition temperature the modulus of elasticity will decrease to such an extent that the heavy load distorts the operator member. In this manner, operator member 66 is stabilized; and, after stabilization, operating member 66 is assembled in the automobile thermostat.

In operation, the automobile thermostat is installed in the cooling system of an engine such that operator member 66 senses the temperature of the upstream coolant through the aperture in central portion 60 of plate 53 and the spaces between legs 62. Assuming the coolant to have an initial temperature below the transition temperature of operator member 66, arcuate surface 54 will engage valve seat 18 to close the valve due to the force from bias spring 64, as illustrated in FIG. 3. When the temperature of the coolant increases to a predetermined operating temperature, the modulus of elasticity of operator member 66 increases such that the spring force from the operator member overcomes the force from bias spring 64, the friction of the valve seat and the small inlet pressure effect on the valve, thus opening the valve. That is, valve member 46 is forced toward valve seat 18 by bias spring 64 and away from valve seat 18 by operator member 66; and, consequently, once the predetermined operating temperature is reached, valve member 46 is moved away from valve seat 18 to open the valve, as shown in FIG. 4.

The operating temperature at which the valve opens is defined within a relatively small zone corresponding to the transition zone for the material. The increase in modulus of elasticity increases greatly in the operating zone such that the operator member can be seen to have an initial, loosely coiled shape when the temperature is above the operating temperature, as shown in FIG. 4, and a distorted, tightly coiled shape when the temperature is below the operating temperature, as shown in FIG. 3. Approximately 80 percent of the movement of operator member 66 will be within the relatively small operating zone such that transition between shapes is rapid.

Thus, the valve assumes a full open position to permit circulation of the coolant through a radiator to properly cool the automobile engine. Once the engine is stopped, the temperature of the coolant decreases; and, after the coolant temperature drops below the operating temperature, the modulus of elasticity of operator member 66 will decrease sufficiently to permit bias spring 64 to overcome the operator member and return the operator to its distorted shape to close the valve.

The automobile thermostat illustrated in the drawing utilizes a coiled spring operator member having a small mean diameter which operates at low stress levels. A coiled spring operator member having a large mean diameter can be utilized with the present invention with increased stress levels in order to accomplish more work which can be used in the form of additional movement and/or force. Such a large diameter operator member may be mounted in compression between flange 10 and a lip extending outwardly radially from the bottom of cylindrical wall 52 of valve member 46.

The automobile thermostat of the present invention has the advantages that the curve of modulus of elasticity vs. temperature can be determined and fixed during manufacture of the material, alloys of nickel and titanium resist corrosion by coolants normally used in automobile engines, and the material supplies high work output in comparison with the amount of energy supplied to the material.

Inasmuch as the present invention is subject to many variations, modifications and changes in detail, it is intended that all matter contained in the foregoing description or shown in the accompanying drawing shall be interpreted as illustrative and not in a limiting sense.

What is claimed is:

1. An automobile thermostat comprising
   valve means including an annular valve seat and a movable valve member cooperating with said valve seat to control a flow of coolant through said valve means;
   bias means acting on said valve member to force said valve member toward said valve seat; and
   an operator member acting on said valve member to force said valve member away from said valve seat and being constructed of a material having a temperature-actuated shape memory;
   said operator member including a coiled spring being disposed upstream of said valve means to sense the temperature of the coolant and having a tightly coiled distorted shape when the coolant temperature is below a predetermined operating temperature and a loosely coiled initial shape when the coolant temperature is above the predetermined operating temperature whereby said operating member undergoes a rapid transition from the distorted shape to the initial shape to overcome said bias means to move said valve member away from said valve seat and open said valve means when the coolant temperature increases above the predetermined operating temperature.

2. The invention as recited in claim 1 wherein said material is an alloy having a composition of 55 percent nickel by weight with the remainder being essentially titanium.

3. The invention as recited in claim 1 wherein said valve means includes stationary support means supporting said valve seat and movable support means connected and movable with said valve member, said bias means is mounted between said stationary support means and said valve member, and said operator member is mounted between said stationary support means and said movable support means.

4. The invention as recited in claim 3 wherein said stationary support means includes a cup-shaped housing, said valve member includes a cylindrical wall disposed concentrically around said housing, said operator member is disposed within said housing, and said bias means is disposed within said cylindrical wall of said valve member and around said housing.

5. The invention as recited in claim 4 wherein said housing has an outwardly extending bottom lip, said valve member has a shoulder extending inwardly and transversely from one end of said cylindrical wall, and said bias means is a coil spring mounted in compression between said lip and said shoulder.

6. An automobile thermostat comprising
   valve means including
      stationary support means including a cup-shaped housing having an annular valve seat and an outwardly extending bottom lip,
      movable support means including a cylindrical wall disposed concentrically around said housing and an annular valve member cooperating with said annular valve seat to control a flow of coolant therethrough, a shoulder extending inwardly and transversely from one end of said cylindrical wall;

bias means including a coil spring mounted in compression between the bottom lip on said housing and the shoulder on said cylindrical wall, said coil spring being disposed within said cylindrical wall and around said housing;

an operator member acting on said valve member to force said valve member away from said valve seat and being constructed of a material having a temperature-actuated shape memory;

said operator member being disposed upstream of said valve means to sense the temperature of the coolant and having a distorted shape when the coolant temperature is below a predetermined operating temperature and an initial shape when the coolant temperature is above the predetermined operating temperature whereby said operating member undergoes a rapid transition from the distorted shape to the initial shape to overcome said bias means to move said valve member away from said valve seat and open said valve means when the coolant temperature increases above the predetermined operating temperature;

said movable support means including a first plate attached to the other end of said cylindrical wall and having a central recess aligned with said housing; and said operator member being a coiled spring mounted in compression between the bottom of said housing and the central recess of said first plate, said coiled spring having a loosely coiled initial shape and a tightly coiled distorted shape.

7. The invention as recited in claim 6 wherein said stationary support means includes a second plate secured to said bottom lip and having a second lip in parallel spaced relation with said bottom lip, and an annular seal is disposed between said bottom lip and said second lip and contacts said cylindrical wall.

8. The invention as recited in claim 7 wherein said first plate is attached to the other end of said cylindrical wall by a plurality of equally spaced legs extending from said central recess, said central recess has an aperture in the center thereof, and said valve member has a second cylindrical wall extending from said shoulder and in sliding contact with said housing.

9. The invention as recited in claim 8 wherein said material is an alloy having a composition of 55 percent nickel by weight with the remainder being essentially titanium.

* * * * *